United States Patent
Cincotta et al.

(10) Patent No.: US 7,025,338 B2
(45) Date of Patent: Apr. 11, 2006

(54) SEAL AND PRESSURE RELIEF FOR STEAM INJECTION HEATER

(75) Inventors: Bruce A. Cincotta, Wauwatosa, WI (US); Matthew Bertsch, West Allis, WI (US)

(73) Assignee: Hydro-Thermal Corporation, Waukesha, WI (US)

( * ) Notice: Subject to any disclaimer, the term of this patent is extended or adjusted under 35 U.S.C. 154(b) by 0 days.

(21) Appl. No.: 10/774,729

(22) Filed: Feb. 9, 2004

(65) Prior Publication Data

US 2004/0188869 A1 Sep. 30, 2004

Related U.S. Application Data

(60) Provisional application No. 60/458,522, filed on Mar. 28, 2003.

(51) Int. Cl.
*B01F 3/04* (2006.01)

(52) U.S. Cl. .................. 261/64.1; 261/77; 261/124; 261/DIG. 10

(58) Field of Classification Search ............... 261/62, 261/64.1, 76, 77, 78.2, 124, DIG. 10, DIG. 13, 261/DIG. 76, DIG. 78; 122/442; 239/417.3, 239/432; 366/178.2, 182.1
See application file for complete search history.

(56) References Cited

U.S. PATENT DOCUMENTS

| 145,538 A | 12/1873 | Stoddart |
| 435,075 A | 8/1890 | McElroy |
| 1,159,721 A * | 11/1915 | Sinclair ............... 261/62 |
| 1,245,985 A | 11/1917 | Saunders |
| 1,315,931 A | 9/1919 | Poppink |
| 1,846,220 A | 2/1932 | McCune, Jr. |
| 2,455,498 A | 12/1948 | Kern |
| 2,483,426 A | 10/1949 | Moore |
| 2,820,620 A | 1/1958 | Anderson |
| 3,197,337 A | 7/1965 | Schink |
| 3,331,590 A | 7/1967 | Battenfeld et al. |
| 3,984,504 A | 10/1976 | Pick |
| 4,160,002 A * | 7/1979 | Janovtchik ............... 261/76 |

(Continued)

FOREIGN PATENT DOCUMENTS

DE 201014 3/1907

OTHER PUBLICATIONS

"Improving Efficiency and Productivity while Lowering Production Costs through Efficient Heating of Liquids and Slurries for Chemical Processing, Pharmaceutical Manufacturing", Hydro-Thermal Corporation, Bulletin H150.

(Continued)

*Primary Examiner*—Scott Bushey

(57) ABSTRACT

A direct contact steam injection heater is placed directly in line with a flow of stock through a pipe. The steam injection heater includes a Mach diffuser having a plurality of steam diffusion holes and an adjustable steam-plug cover that is positioned within a stationary diffuser tube to modulate the amount of steam added to the flowing stock by exposing a desired number of steam diffusion holes. The steam tube assembly includes an O-ring that forms a seal along the inner wall of the diffuser tube to prevent the flow of stock into the steam tube assembly when steam pressure is not present. Select areas of the steam injection heater, including the deflection plate, diffuser tube and heater body inner wall are coated with a wear coating such as tungsten carbide. Further, a pair of pressure ports are formed in the steam-plug cover to equalize the pressure between the open interior of the steam-plug cover to further facilitate rotation of the steam-plug cover.

18 Claims, 9 Drawing Sheets

U.S. PATENT DOCUMENTS

| | | | |
|---|---|---|---|
| 4,198,357 A | 4/1980 | Berriman et al. | |
| 4,473,512 A | 9/1984 | Pick et al. | |
| 4,474,477 A * | 10/1984 | Smith et al. | 366/165.5 |
| 4,556,523 A * | 12/1985 | Lecoffre et al. | 261/123 |
| 4,732,712 A | 3/1988 | Burnham et al. | |
| 4,931,225 A | 6/1990 | Cheng | |
| 5,076,293 A * | 12/1991 | Kramer | 131/291 |
| 5,395,569 A | 3/1995 | Badertscher et al. | |
| 5,622,655 A | 4/1997 | Cincotta et al. | |
| 5,842,497 A | 12/1998 | Drifka et al. | |
| 6,082,712 A * | 7/2000 | Cincotta et al. | 261/76 |
| 6,186,481 B1 * | 2/2001 | Pirkle | 261/39.1 |
| 6,361,025 B1 * | 3/2002 | Cincotta et al. | 261/77 |
| 6,860,718 B1 * | 3/2005 | Suzuki et al. | 415/173.5 |

OTHER PUBLICATIONS

"Efficient Steam Heating of Liquids and Slurries", Hydro-Thermal Corporation, Bulletin H120.

"Automatic Temperature Control" Hydro-Thermal Corporation, Application Bulletin A-3.

"Hot Liquids on Demand", Hydro-Thermal Corporation, Form H112.

"Automatic Intermittent Heating", Hydro-Thermal Application Bulletin A-11.

* cited by examiner

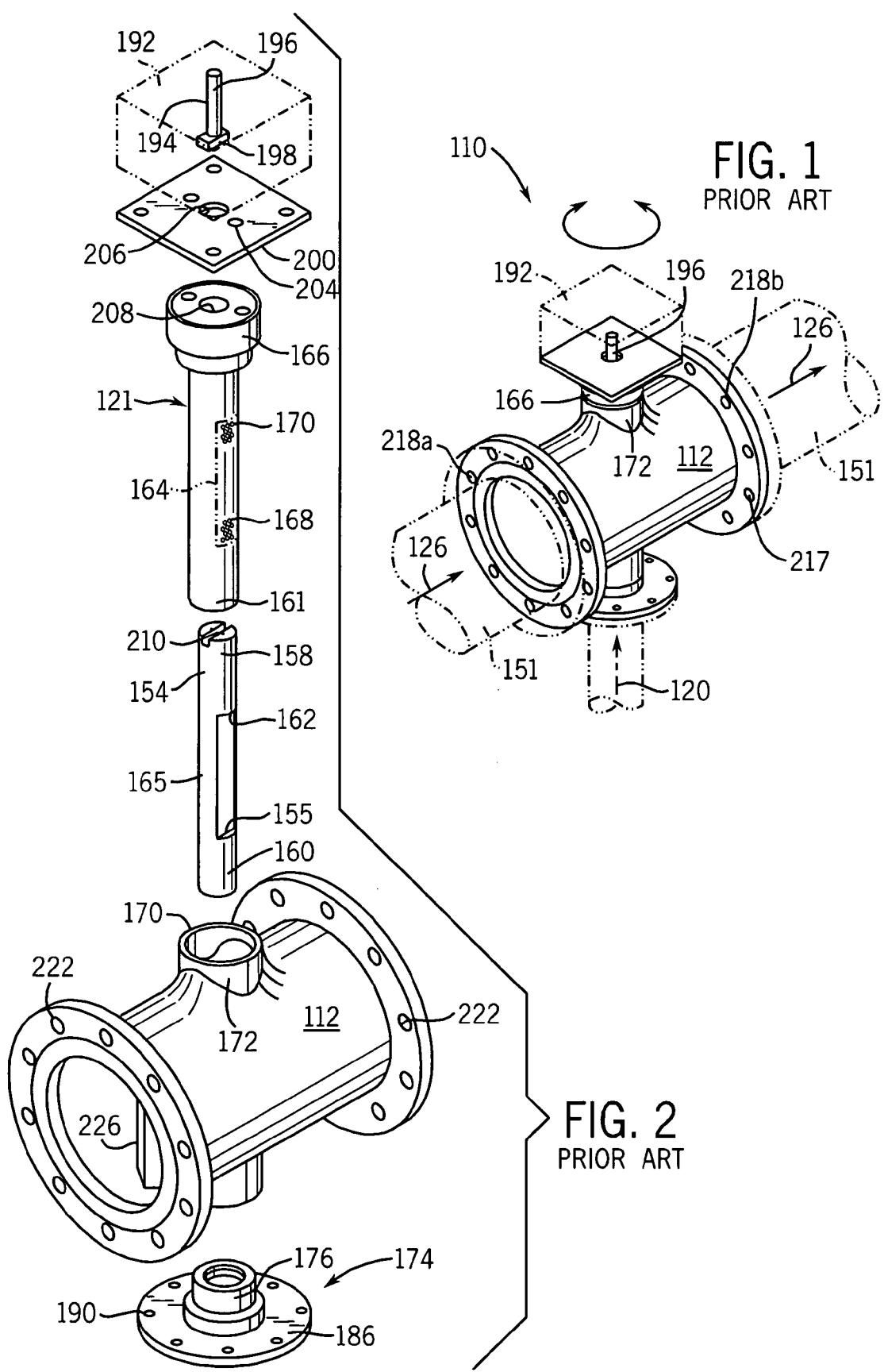

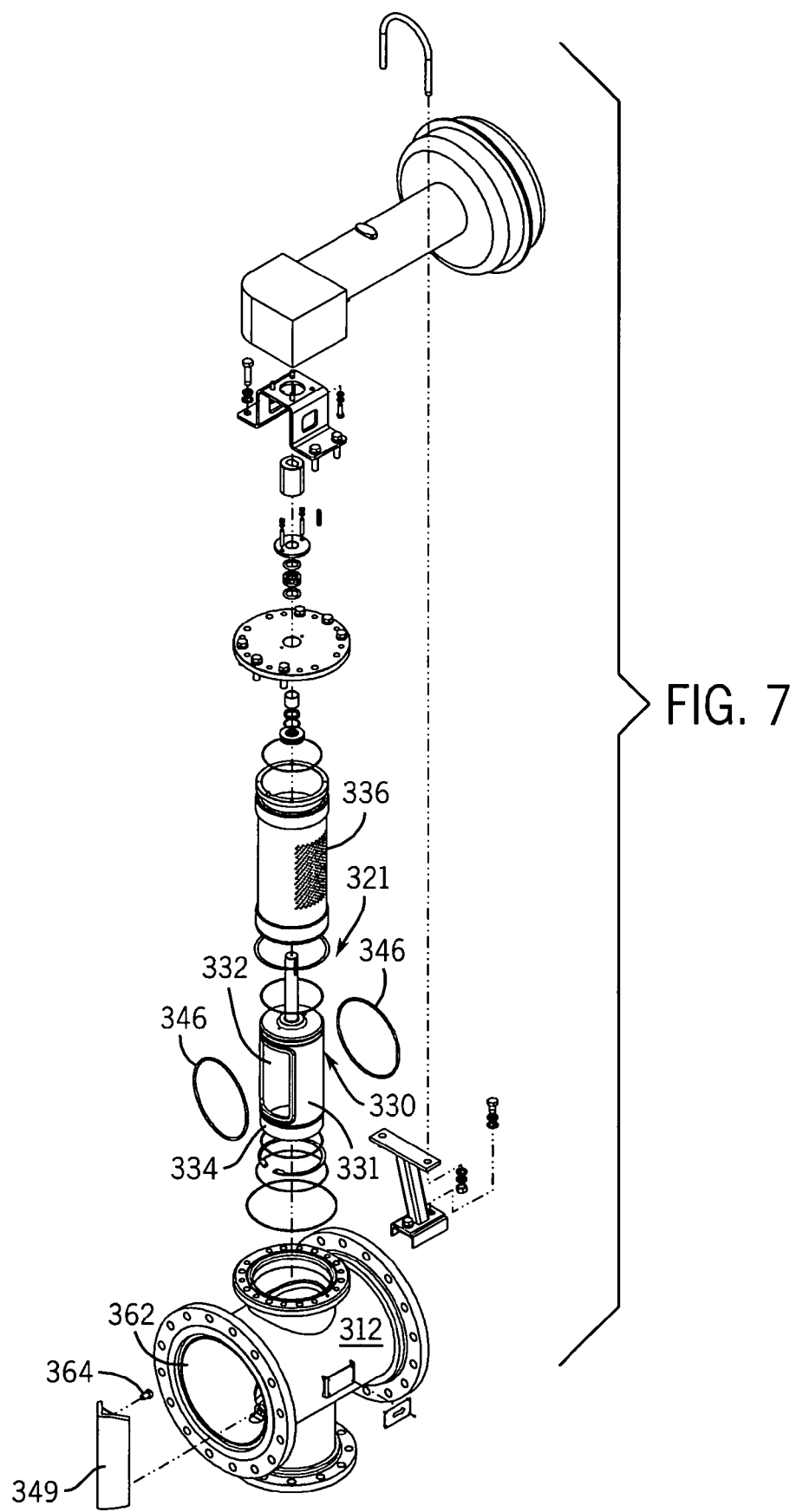

SEAL AND PRESSURE RELIEF FOR STEAM INJECTION HEATER

CROSS-REFERENCE TO RELATED APPLICATION

The present application is based on and claims priority to U.S. Provisional Patent Application No. 60/458,522 filed Mar. 28, 2003.

BACKGROUND OF THE INVENTION

The present invention relates to direct contact steam injection heaters that use full pressure steam. More particularly, the invention relates to a direct contact steam injection heater for heating certain types of slurries that contain abrasive material.

In direct contact steam injection heaters, steam is directly mixed into a flowing stock (e.g. liquid or slurry) being heated. Direct contact steam injection heaters are very effective at transferring heat energy to the flowing stock. They provide rapid heat transfer with virtually no heat loss to the atmosphere, and also transfer both the latent and the available sensible heat of the steam to the liquid slurry.

The present invention was developed during ongoing developmental efforts by the assignee in the field of direct contact steam injection heaters. U.S. Pat. No. 5,622,655 entitled "Sanitary Direct Contact Steam Injection Heater And Method" by Bruce A. Cincotta et al., issuing on Apr. 22, 1997, U.S. Pat. No. 5,842,497 entitled "Adjustable Direct Contact Steam Injection Heater", by Brian Drifka and Bruce A. Cincotta, issuing on Dec. 1, 1998, and U.S. Pat. No. 6,361,025 entitled "Steam Injection Heater With Transverse Mounted Mach Diffuser", issuing on Mar. 26, 2002 represent some of the prior developments in direct contact steam injection heaters by the assignee, and are hereby incorporated by reference.

These types of direct contact steam injection heaters use full pressure steam (i.e. the full amount of steam pressure available), and modulate the amount of steam added to the flowing liquid or slurry by a nozzle and plug configuration. The steam exits through the nozzle under sonic choked flow conditions. The high speed steam from the nozzle shears the flowing liquid or slurry, and creates a homogeneous blend in a combining region located downstream of the nozzle. As heat is transferred, the steam condenses.

Another direct contact steam injection heater was developed by the assignee for heating purified water or other liquids in which steam bubbles tend to merge to create large steam bubbles prior to condensing. This direct contact steam injection heater is disclosed in U.S. Pat. No. 6,082,712, and incorporated herein by reference. This direct contact steam injection heater employs a Mach diffuser. The Mach diffuser injects a sonic velocity steam into the liquid stock through a plurality of relatively small steam diffusion holes. The Mach diffuser is generally coaxial with the heater body and resides within the inlet of a combining region. The purified water or other liquid flows in a radial direction through the inlet into the combining region and turns at an essentially right angle to flow through the combining region. The steam exits the coaxial Mach diffuser as small jets of steam injecting partially into the axial flow through the combining region. The velocity of the liquid flowing through the channel between the Mach diffuser and the combining region is maintained at a relatively high velocity (i.e., a relatively small flow area in the channel compared to the downstream portion of the combining region).

Although the transverse mounted Mach diffuser shown and taught by U.S. Pat. No. 6,361,025 is effective and efficient for heating a flow of slurry in an in-line configuration to eliminate the requirement that stock flow negotiates sharp turns, additional difficulties are presented when attempting to heat the flow of slurry having abrasive materials, such as fine sand particles or other similar components.

SUMMARY OF THE INVENTION

The invention is a direct contact steam injection heater in which steam is introduced into a flow of stock that is flowing axially through a pipe. The heater is installed in line and allows continued axial flow of the stock so the stock flow is not required to negotiate sharp turns when passing through the heater. That is, the heater includes a heater body having a flowing stock inlet and a heated stock discharge outlet that are aligned to provide axial flow through the pipe and the heater body. Full pressure steam is introduced into the stock through a Mach diffuser that is mounted transverse to the axial flow through the heater body. The Mach diffuser has a plurality of steam diffusion holes through which small jets of steam are injected into the flowing stock. The small steam jets break apart easily in viscous slurries and disperse before the steam has a chance to conglomerate into large bubbles that can create "steam hammers" and lead to unwanted vibration within the heating system. Furthermore, small steam bubbles dissipate heat more efficiently and thereby prevent hot and cold spots in the flowing stock.

The Mach diffuser has an adjustably positionable steam-plug cover. The adjustably positionable steam-plug cover obstructs a selected amount of the steam diffusion holes in order to modulate the amount of steam discharged through the Mach diffuser into the flow of stock. The steam-plug cover is preferably rotatable relative to the longitudinal axis of the transversely mounted Mach diffuser.

The Mach diffuser preferably has a diffuser tube having a cylindrical wall containing the steam diffusion holes. The diffuser tube is preferably a cylindrical wall nested outside the steam-plug cover. The preferred diffuser tube has an internal region within the cylindrical wall that receives steam passing into the heater. The cylindrical wall has multiple steam openings that enable steam to flow from the internal region in the steam-plug cover through the exposed steam diffusion holes in the Mach diffuser, and into the axial flow of stock.

Preferably, there are two steam openings in the steam-plug cover, each consisting of a longitudinal slot located on opposite sides of the steam-plug cover. The longitudinal slots preferably have widths that occupy less than one quarter of the circumference of the cylindrical wall of the steam-plug cover.

The Mach diffuser has an upstream surface area and a downstream surface area on the cylindrical wall of the diffuser tube, each occupying less than one quarter of the circumference of the transversely mounted Mach diffuser. The upstream and downstream surface areas of the diffuser tube do not contain steam diffusion holes. The side surface areas on the diffuser tube of the Mach diffuser contain the steam diffusion holes. The Mach diffuser is oriented in the heater body such that the upstream surface area faces into the axial flow of the stock. This orientation to prevents unnecessary plugging of the diffusion holes on the upstream surface.

Preferably, a deflector is mounted upstream of the Mach diffuser. The deflector deflects the flow of stock around the upstream surface area on the Mach diffuser and towards the side surfaces of the Mach diffuser. This prevents flow directly into a fluid stagnation point on the upstream surface of the Mach diffuser. The deflector is preferably attached to the inside wall of the heater body by a pair of removable connectors such that it does not become dislodged in the face of heavy flows of viscous slurries but can be removed for replacement as required.

The Mach diffuser includes a pair of O-rings, each of which surround one of the longitudinal slots located in the steam-plug cover. The O-rings slightly protrude from the otherwise cylindrical wall of the steam-plug cover and form a seal with the inner surface of the diffuser tube. The seal created by the O-ring between the diffuser tube and the steam-plug cover prevents backflow of a fibrous slurry or other type of slurry into the steam-plug cover, particularly when steam is not being supplied to the Mach diffuser.

The amount of full pressure steam discharged through the Mach diffuser into the axially flowing stock is modulated by adjusting the position of the steam-plug cover over a selected amount of steam diffusion holes. The steam-plug cover is preferably adjustable between a fully closed position in which no steam diffuser holes are exposed to a fully open position where a maximum number of the steam diffusion holes are exposed. This adjustment is preferably accomplished with a rotating actuator having a key that engages one end of the cover. When the actuator rotates the key, the cover is positioned to expose a generally proportional amount of steam diffusion holes in the Mach diffuser. Radial jets of steam then flow through the exposed steam diffusion holes into the axial flow of stock.

When the steam-plug cover is in the fully closed position, the diffusion holes formed in each side of the diffuser tube are positioned between the pair of O-rings that surround the longitudinal slots formed in the steam-plug cover. Since the pair of O-rings create a seal with the inner surface of the diffuser tube, the pair of O-rings prevent the slurry material from passing through the diffusion holes and along the outer surface of the steam-plug cover to reach the longitudinal open slots formed in the steam-plug cover. Since each of the longitudinal slots occupies less than one quarter of the outer circumference of the steam-plug cover, an O-ring seal is formed on each side of the series of diffusion holes formed in the diffuser tube. Thus, when the steam-plug cover is in the fully closed position, the pair of O-rings prevents the slurry from entering into the steam-plug cover. This feature is particularly relevant when no positive pressure is included in the open interior of the steam-plug cover, such as when steam is no longer being applied to the Mach diffuser.

The steam-plug cover includes a pair of pressure ports that each extend through the top wall of the steam-plug cover. The pair of pressure ports equalize the pressure within the open interior of the steam-plug cover and the rotational components for the steam-plug cover. The pair of pressure ports equalize the pressure, which allows the steam-plug cover to be more easily rotated relative to the stationary diffuser tube.

The Mach diffuser is designed for use with slurries including entrained particulate matter, such as sand or other solid particles. The entrained sand and particulate matter increases the wear on the components of the Mach diffuser and heater that directly contact the slurry. To address such problem, a wear coating is applied to the upstream deflector, stationary diffuser tube and along the inside wall of the heater body. Preferably, the wear coating is formed from a tungsten carbide material applied in an even thickness over the metallic outer surface of each component. The wear coating increases the durability of each of the parts that are in direct contact with the slurry passing through the heater body.

It should be apparent to those skilled in the art that the use of an actuator to rotate the cylindrical cover for the Mach diffuser is especially accommodating for large volume flows through pipes having relatively large diameters. The rotatable cover allows for generally consistent injection of steam across the entire length of the transversely mounted Mach diffuser. In addition, the stroke on a linear actuator may create installation problems.

Various other features, objects, and advantages of the invention will be made apparent from the following detailed description and the drawings.

BRIEF DESCRIPTION OF THE DRAWINGS

The drawings illustrate the best mode presently contemplated of carrying out the invention.

In the drawings:

FIG. 1 is an isometric view of an installed direct contact steam injection heater in accordance with the invention;

FIG. 2 is an assembly view of the heater shown in FIG. 1;

FIG. 7 is an assembly view of the present, preferred embodiment of the Mach heater;

DETAILED DESCRIPTION OF PREFERRED EMBODIMENTS

The invention as illustrated in FIGS. 1–12 is designed to accommodate large flows of slurries or other viscous liquids containing materials that tend to flocculate, such as suspended fibrous or particulate matter. In accordance with the invention, the heater 110 has a Mach diffuser 121 that is placed transversely in the heater body 112. The heater body 112 is connected in line with a stock supply pipe.

Figure 3:
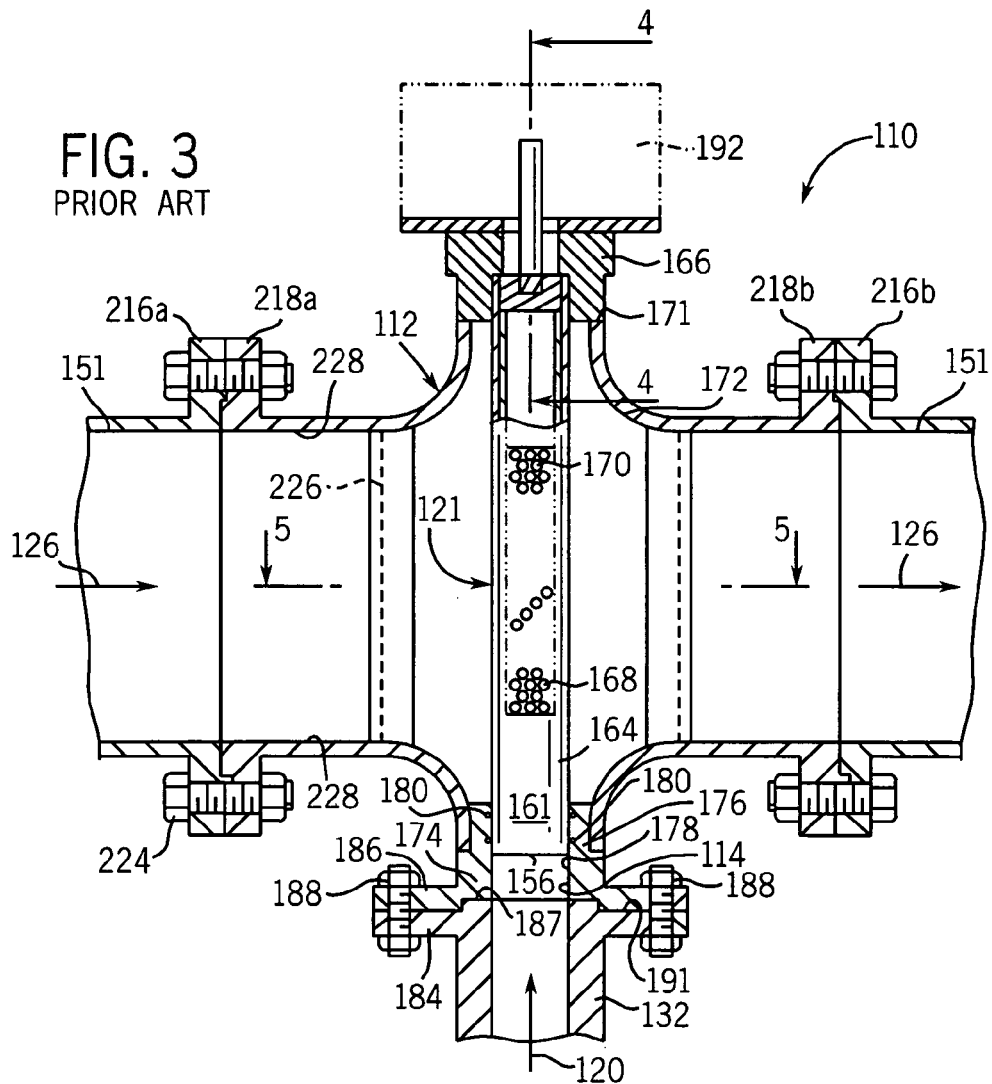
FIG. 3 is a side view showing a cross-section of the steam injection heater shown in FIGS. 1 and 2 as it is installed in a pipe through which a flow of stock flows axially.

As shown in FIGS. 1–3, steam 120 flows into heater 110 through a steam inlet 114, and into an internal region 152 (FIG. 5) defined by a cover 154 located within the Mach diffuser 121. Steam 120 enters internal region 152 through an opening 156 located near steam pipe 132. Cover 154 is a cylindrical wall having a closed end 158 and an open end 160, FIG. 2. Steam is supplied through the cover 154 via openings 162 (only one opening 162 is shown in FIG. 2, the other opening is directly opposite of the opening 162 that is shown) at essentially the full steam pressure available at the heater 110.

As shown in FIGS. 2 and 3, the Mach diffuser 121 includes an open end 161, a cylindrical wall 164 and a flanged base 166. An internal region within the Mach diffuser 121 is defined by the base 166 and the cylindrical wall 164. Cover 154 is preferably contained within the internal region of the Mach diffuser 121.

The cylindrical wall 164 of the Mach diffuser 121 includes a plurality of radial steam diffusion holes 168. The size and number of the steam diffusion holes is a matter of choice depending on the size of heater 110. However, a diameter of about ⅛ of an inch is preferred for most stocks. Such a diameter is sufficiently small to facilitate the creation of relatively small radial jets of steam through the diffuser wall 164, yet is not so small as to create other problems such as plugging or scaling. In addition, it is preferred that the Mach diffuser 121 be made of stainless steel, and that the cylinder wall 164 for the Mach diffuser have a thickness sufficient to avoid premature deterioration as steam passes through the plurality of steam diffusion holes 168 over extended periods of time.

The plurality of steam diffusion holes 168 are arranged at least in part longitudinally along the cylinder wall 164. In this manner, the amount of steam supplied through the Mach diffuser 121 into the stock 126 flowing through the heater body 112 can be easily modulated by moving the adjustably positionable cover 154 to expose a selected number of steam diffusion holes 168. The pattern of steam diffusion holes 168 in the Mach diffuser 121 as shown in FIG. 3 includes rows of steam diffusion holes 168, with each row 170 being offset from the immediately adjacent rows in order to provide high hole density.

Figure 4:
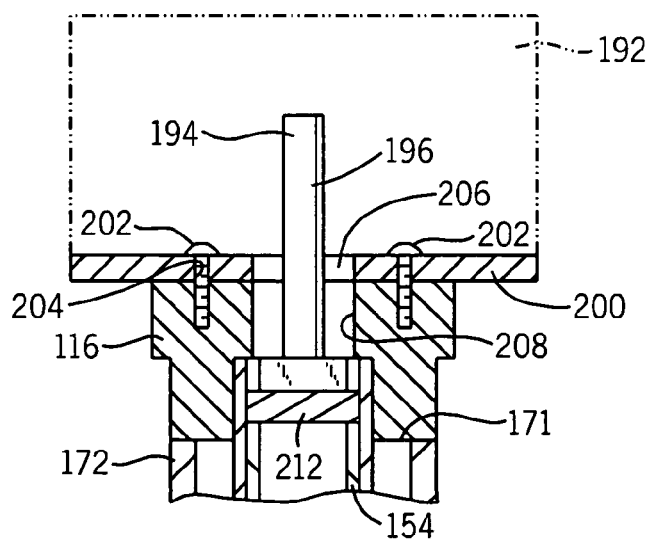
FIG. 4 is a view taken along line 4—4 in FIG. 3.

Referring now in particular to FIGS. 3 and 4, Mach diffuser 121 is attached to heater body 112 first by seating the Mach diffuser base 166 on a rim 171 located on an outwardly extending cylindrical flange 172 extending from heater body 112. Next, the Mach diffuser end 161 engages a seal assembly 174 located at the steam inlet 114, FIG. 3. Seal assembly 174 is attached to heater body 112 by inserting a lip 176 on the seal assembly 174 into an outwardly extending steam inlet projection 114 of the heater body 112. The interior surface 178 of seal assembly 174 is preferably sealed by a pair of O-rings 180 against the end 161 of the Mach diffuser 121, although other types of sealing arrangements may be used.

The steam pipe 132 has a radially extending flange 184 that engages a flange 186 of seal assembly 174. Preferably, flange 184 is not flush with the end 187 of steam pipe 132, so that end 187 extends slightly outward from the surface 191 of the flange 186 on the seal assembly 174. This interface preferably forms a stepped seal to prevent steam from escaping. Flange 186 and flange 184 are secured using bolts 188 extending through holes 190, FIG. 2.

An actuator 192 drives rotation of the cover 154 by rotating an actuator key 194. The actuator 192 is shown in the drawings as a phantom box. One skilled in the art will recognize that the actuator 192 may be activated manually, pneumatically or electrically. Preferably, the operation of the actuator, if pneumatic or electric, is controlled by an electronic controller in response to a feedback signal from a downstream temperature sensor. The preferred actuator is a quarter turn pneumatic actuator that provides shaft rotation of 90°. The actuator key 194 has a shank 196 and a key head 198. The key 194 engages the output shaft of the actuator 192 using means appropriate for the type of actuator provided.

The actuator 192 is mounted on an actuator plate 200 that is secured to the base 166 of the Mach diffuser. As shown in FIGS. 4 and 2, the actuator 192 is mounted to base 166 of the Mach diffuser using a pair of threaded bolts 202 that are screwed into apertures 204 located in the base 166 and the actuator plate 200. Openings 206 and 208 are located in the actuator plate 200 and the base 166 of the Mach diffuser, respectively. The openings allow passage of actuator key 194 into the base 166 of the Mach diffuser for engagement with the cover 154. Openings 206 and 208 are aligned with the longitudinal axis of rotation for the cover 154. The actuator key head 198 engages the cover 154 at the top end 158 of the Mach diffuser where a key slot 210 is provided. Preferably, the key slot 210 is located in a disc-shaped end cap 212, FIG. 4, that is rigidly attached (e.g., welded) to the top of the cover 154 at end 158.

As shown in FIGS. 1 and 3, the heater body 112 is attached to the stock supply pipe 151 in such a manner that the longitudinal flow axis of heater body 112 is aligned with the longitudinal flow axis of the supply pipe 151. The supply pipe 151 is fitted with flanges 216a, 216b that are designed to engage flanges 218a, 218b, respectively, located on heater body 112. The flanges 216a, 216b on the pipe extend radially from the cylindrical surface of the pipe 151, and are preferably welded to the supply pipe 151. Flanges 216a, 216b and 218a, 218b preferably have a stepped interface 120. Flanges 216a, 216b, and flanges 218a, 218b have apertures 122 provided therein through which bolts 224 are passed to secure the heater body 112 to the pipe 151.

Figure 5:
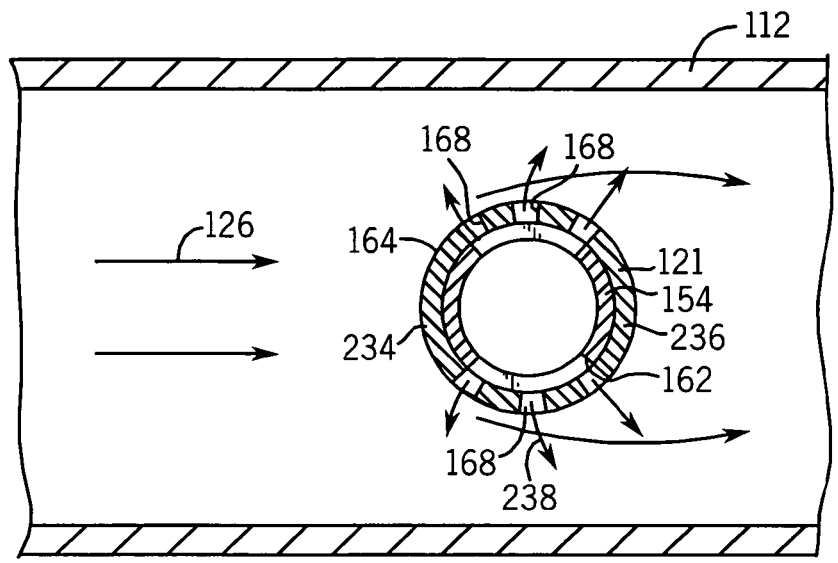
FIG. 5 is a view of the Mach diffuser taken along line 5—5 in FIG. 3.

FIG. 5 illustrates the flow of stock 126 through the heater body 112. Note that the flow wets the outer side surfaces of the Mach diffuser 121. In the embodiment shown in FIG. 5, however, there is likely to be a stagnation point at the upstream surface 234. The existence of a stagnation point is likely to cause unwanted accumulation of suspended materials on or near the Mach diffuser 121. Therefore, it may be desirable to use a deflector 226 positioned upstream of the Mach diffuser, see FIGS. 6a and 6b.

Figure 6A:
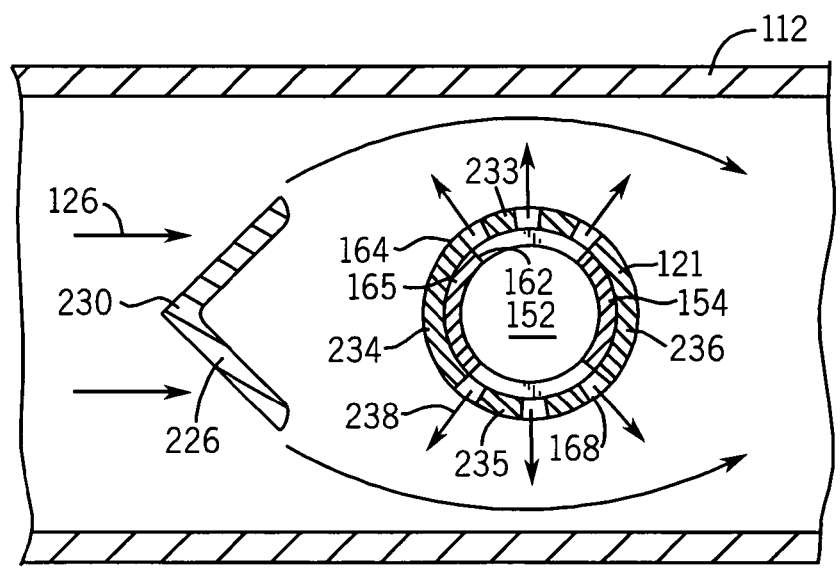
FIG. 6a is a view similar to FIG. 5 further showing a deflector positioned upstream from an upstream surface area of the Mach diffuser, and also showing a cover aligned so that it does not obstruct steam diffusion holes in the Mach diffuser.
Figure 6B:
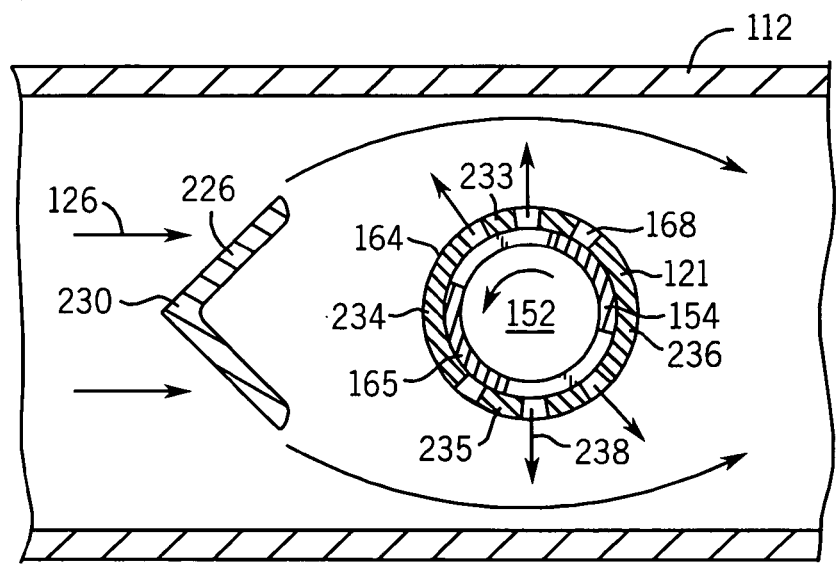
FIG. 6b is a view as shown in FIG. 6a with the cover rotated to partially close steam injection holes through the Mach diffuser.

Referring now to FIGS. 6a and 6b, a deflector 226 is preferably located within the heater body 112 in a position upstream from the Mach diffuser 321. Preferably, deflector 226 is welded to inner surface 228 (FIG. 3) of the heater body 112 in order to secure the deflector 226 in a manner that is capable of withstanding pressure from the stock flow through the pipe 151. The deflector 226 is preferably constructed from an angle-iron shaped piece of metal, such as stainless steel. A leading edge 230 of the deflector 226 is aligned with the central axis of the Mach diffuser 121. The symmetric shape of deflector 226 deflects the flow of stock away from the upstream surface area 234 on Mach diffuser 121 and towards the side surface areas 233, 235. Thus, deflector 226 helps to prevent materials suspended in the stock 126 from flocculating in steam diffusion holes 168 facing upstream or partially upstream, and also prevents the stock 126 from stagnating at the Mach diffuser 121 at the upstream surface area 234.

The Mach diffuser 121 is mounted to the heater body 112 transversely to the longitudinal flow axis through heater body 112. Upstream surface area 234 and downstream surface area 236 each occupy substantially one quarter or 90° of the circumference of the Mach diffuser 121. Upstream surface area 234 is directly opposite downstream surface area 236, and both are aligned so that the center of the 90° arc defining each area is substantially aligned with the longitudinal flow axis through heater body 112 and the pipe 151. Steam diffusion holes are not present in the upstream surface area 234 and the downstream surface area 236. Steam diffusion holes 168 are located in the arcs remaining between upstream surface area 234 and downstream surface area 236, i.e., steam diffusion holes 168 are located in the side surface areas 233, 235.

The cover 154 is preferably placed concentrically inside the Mach diffuser 121, although one skilled in the art should realize the cover 154 may be placed concentrically around the outside surface of Mach diffuser 121. Like Mach diffuser 121, cover 154 has two areas of solid wall that each comprise substantially one quarter or 90° of the cover 154 circumference. Preferably, two longitudinal slots 162 are centrally positioned on each side of the cover 154. Each slot 162 has a width substantially one quarter or 90° of the circumference of the cover 154. The ends 158 and 160 of the cover 154 also have a solid wall around the entire circumference. Only the central portion 155 of the cover 154 are slotted. The perimeter defining the slots 162 on the cover 154 is substantially coextensive with the perimeter defining the area of the Mach diffuser 121 having steam diffusion holes 168 when the heater is in the fully open position.

In operation, the cover 154 is rotated to selectively cover steam diffusion holes 168 in the Mach diffuser 121 either partially, or completely. Steam 120 flows through the heater inlet 114 into an internal region within the Mach diffuser 121 through opening 156, FIG. 3. Steam flows from the internal region within the Mach diffuser into the flow of stock 126 by passing through the uncovered steam diffusion holes 168 in the Mach diffuser 121. In FIG. 6a, the cover 154 is shown in a completely open position, and all of the steam diffusion holes 168 are open. In FIG. 6b, the cover 154 is shown in a partially closed position so that only a portion of the steam diffusion holes 168 are open. When the cover 154 is fully closed (not shown), the cylindrical wall 165 of the cover 154 covers all of the steam diffusion holes 168 in the Mach diffuser wall 164, and no steam is allowed to flow through the Mach diffuser 121 into the flow of stock 126. When the cover 154 is moved to an open or partially open position, steam within internal region 152 of the cover 154 flows through the exposed steam diffusion holes 168 of the Mach diffuser 121. Steam flows through the respective steam diffusion holes 168 in the form of high velocity jets of steam 238 into the flow of stock 126 through the heater body 112.

The inside diameter of the heater body 112 should match the inside diameter of the stock supply pipe 151. It is desired that the velocity of the stock be sufficient to continually wet the outer side surfaces 233, 235 of cylindrical wall 164 of Mach diffuser 121, thus eliminating the likelihood that continuous large bubbles will generate from the small jets of steam 238 into the flow of stock 126.

The steam pressure within Mach diffuser 121 is sufficient so that the flow of steam through the steam diffusion holes is not hindered by the flow of stock 126. As long as there is a sufficient pressure drop across the open steam holes 168, the flow of steam 120 into stock 126 will remain stable. The flow rate of steam 120 is defined by the steam pressure and the accumulated flow area of the exposed steam diffusion holes 168. As mentioned, the amount of steam 120 added to the flowing stock 126 is precisely modulated by adjusting the position of the cover 154 to expose the proper amount of steam diffusion holes 168.

Figure 11:
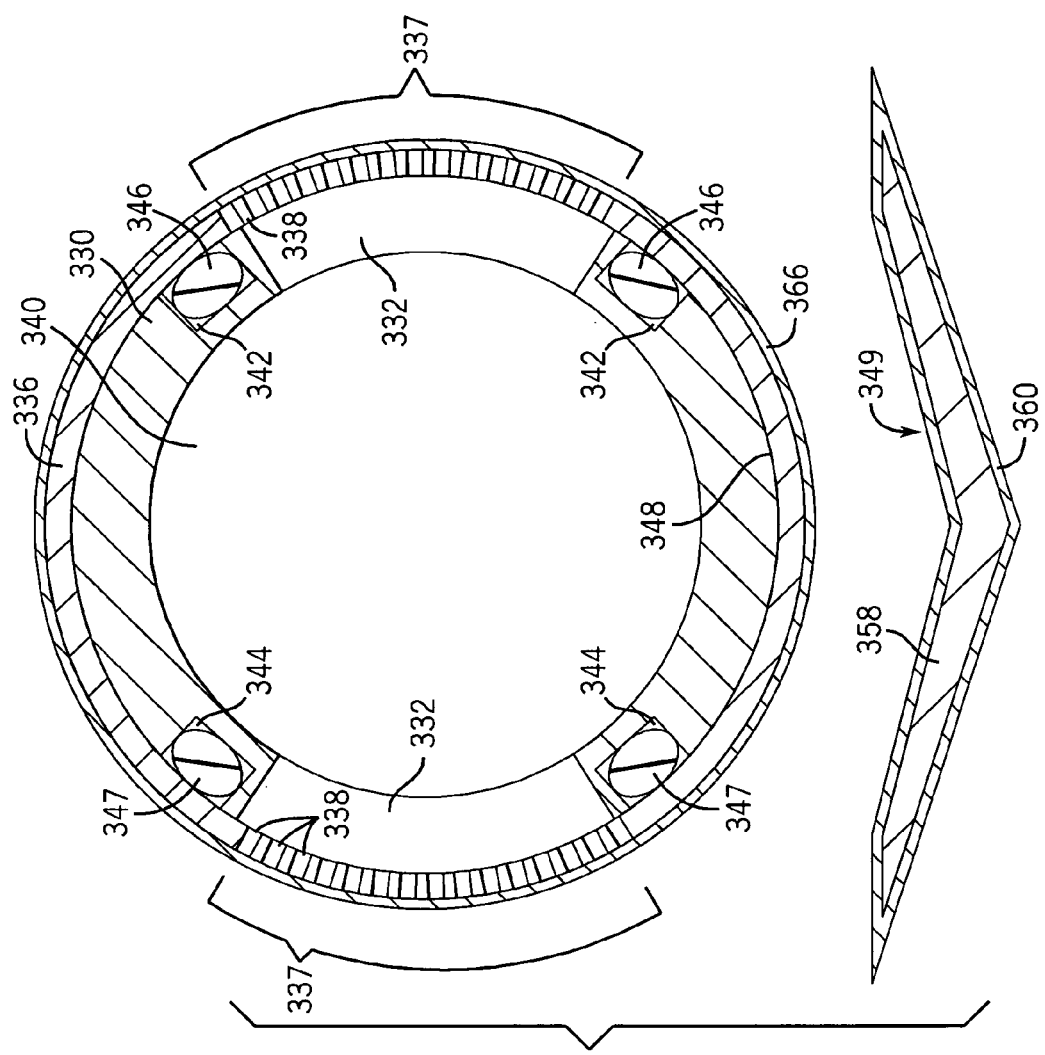
FIG. 11 is a magnified view of the Mach diffuser shown in FIG. 10.

Referring now to FIG. 7, an improved, alternate embodiment of the Mach diffuser is shown by reference numeral 321. The Mach diffuser 321 includes a steam-plug cover 330 having a generally cylindrical outer wall 331. The cylindrical outer wall 331 includes a pair of longitudinal open slots 332 that each occupy less than one quarter of the circumference of the steam plug 330. The slots 332 provide access to a generally open interior 340, as shown in FIG. 11. The longitudinal slots 332 are spaced 180° apart from each other along the outer circumference of the steam-plug cover 330. The steam-plug cover 330 receives a supply of steam through its end 334 such that steam is supplied into the open interior 340 defined by the steam-plug cover 330.

Figure 8:
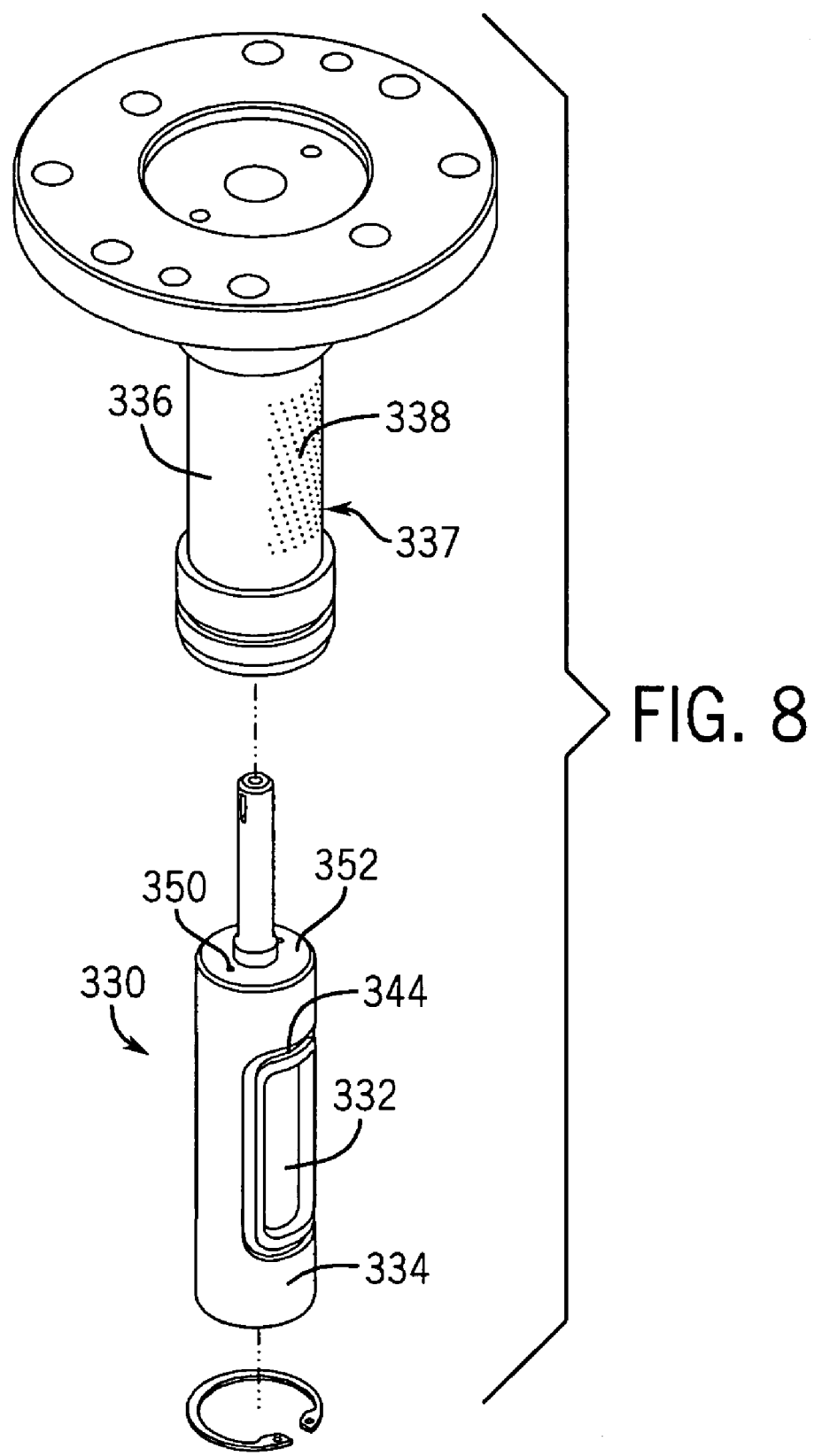
FIG. 8 is an assembly view of the Mach diffuser of the present invention.
Figure 9:
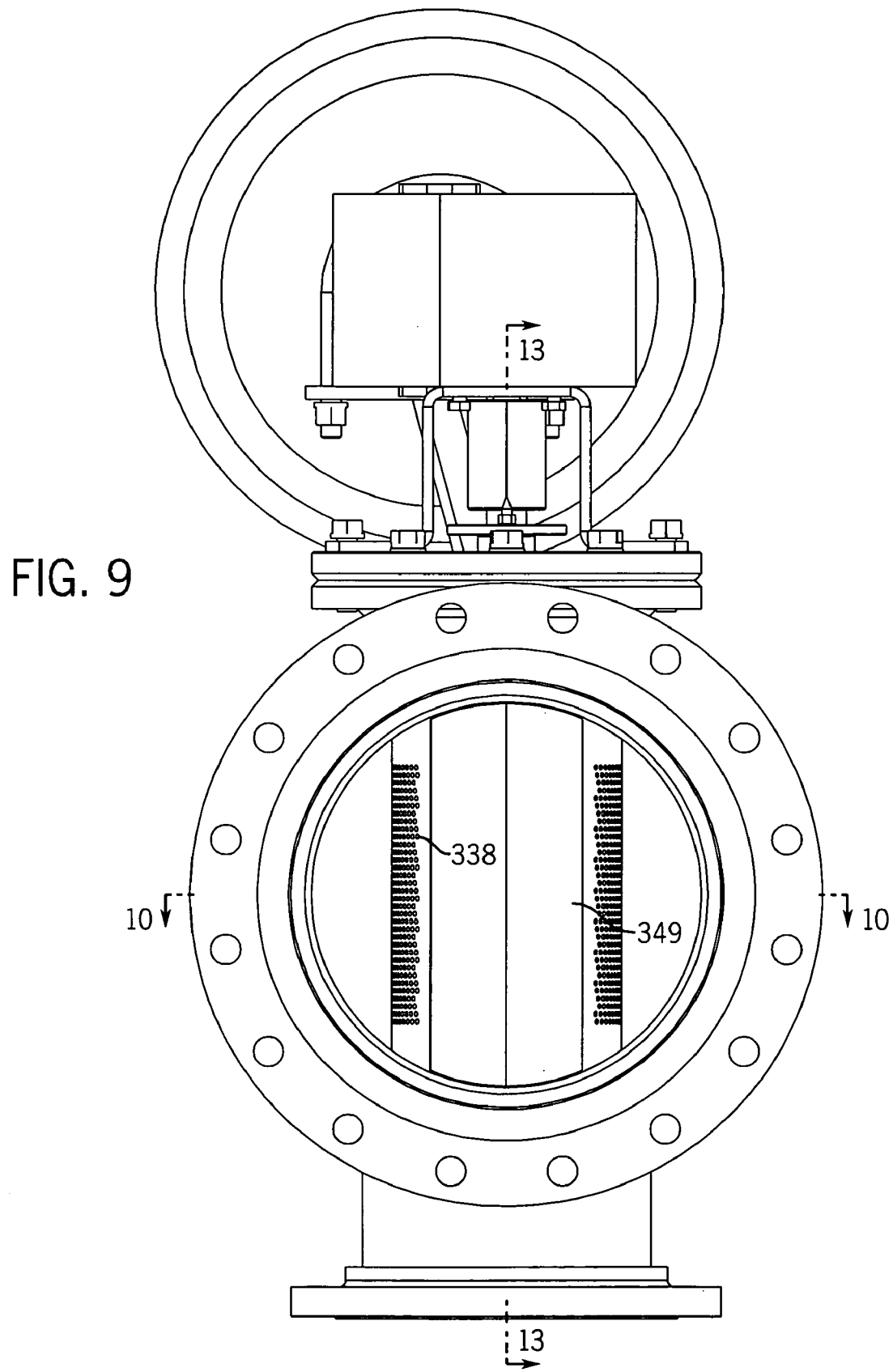
FIG. 9 is an end view of the direct contact steam injection heater of the present invention.

As illustrated in FIGS. 8 and 11, the steam-plug cover 330 is received within a diffuser tube 336 having two emitter sections 337 each having a plurality of diffuser holes 338. The emitter sections 337, including diffuser holes 338, are spaced 180° apart from each other and define an area through which steam can pass through the otherwise cylindrical wall of the diffuser tube 336. During operation of the Mach diffuser 321, the steam-plug cover 330 can be rotated relative to the stationary diffuser tube 336 such that the longitudinal slots 332 are selectively positioned in alignment with the series of diffuser openings 338. Thus, when the rotatable steam-plug cover 330 is in the fully open position shown in FIG. 11, steam can flow through each of the longitudinal slots 332 and out of the diffuser openings 338. When the steam-plug cover 330 is in the fully open position, steam from within the internal opening 340 can flow out of the Mach diffuser through the longitudinal slots 332 and the diffuser openings 338.

Referring again to FIGS. 8 and 11, the outer wall of the steam-plug cover 330 includes a pair of slots 342 and 344 that each surround one of the longitudinal slots 332. The slots 342 and 344 are sized to each receive an O-ring 346 and 347. When the steam-plug cover 330 is placed within the diffuser tube 336, the O-rings 346, 347 contact the inner, smooth wall 348 of the cylindrical diffuser tube 336 to provide a liquid-tight seal therebetween.

Figure 12:
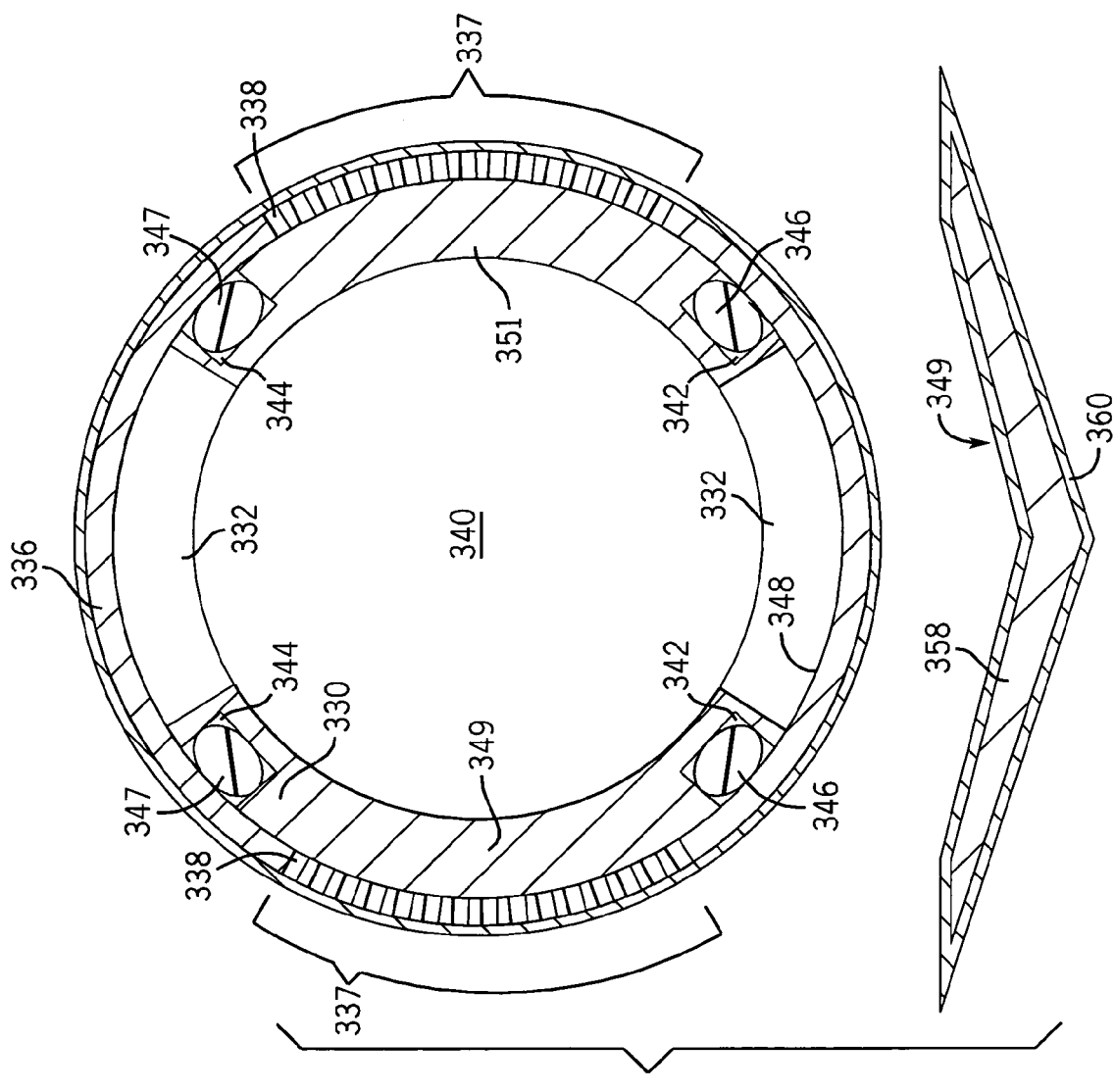
FIG. 12 is a magnified view of the Mach diffuser in which the steam tube assembly is rotated 90° relative to FIG. 11.

As shown in FIG. 12, when the steam-plug cover 330 is rotated 90° to a fully closed position, the O-rings 346, 347 create a fluid-tight seal on each side of the emitter sections 337 to prevent the slurry material from flowing through the diffuser openings 338 and into the longitudinal slots 332. As previously described, each of the longitudinal open slots 332 formed in the steam-plug cover 330 comprise less than one quarter of the outer circumference of the steam-plug cover. Thus, the solid wall sections 349 and 351 combine to comprise more than one-half the circumference of the steam-plug cover 330. As can be understood in FIG. 12, the circumferential length of each of the emitter sections 337 formed in the diffuser tube 336 is less than the circumferential distance of the solid wall sections 349, 351 between the pair of O-rings 346, 347. Thus, each of the emitter sections 337 is captured between the pair of O-rings 346, 347 when the steam-plug cover 330 is rotated to the fully closed position shown in FIG. 12.

The use of the O-rings 346, 347 is particularly desirable when steam pressure is not present within the open interior 340. Without the O-rings, when steam pressure is not present, the slurry of material can pass between the outer surface of the steam-plug cover 330 and the inner wall of the diffuser tube 336 and enter into the open interior 340. The O-rings 346, 347 operate to prevent the flow of material in such a direction.

Figure 13:
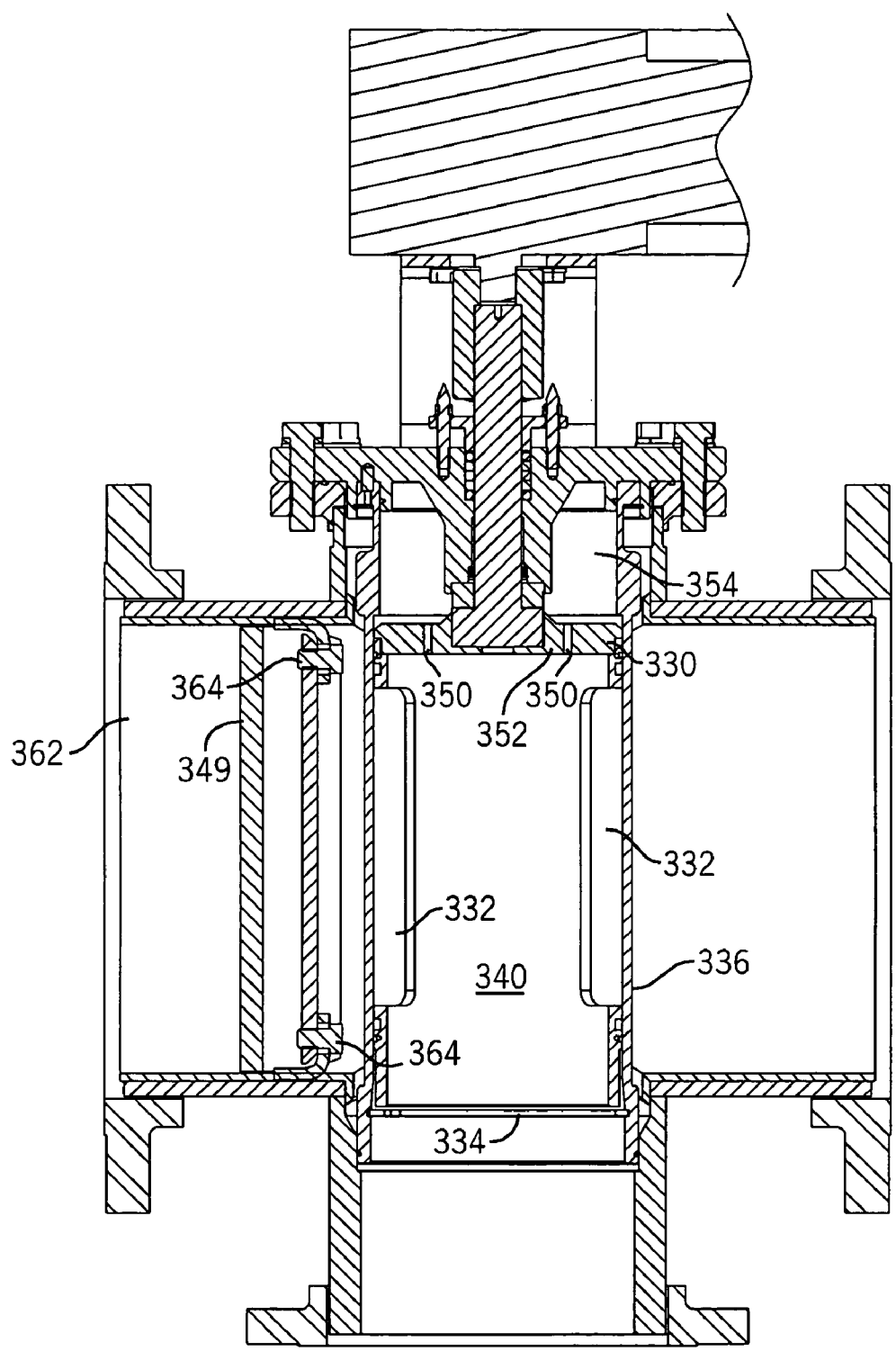
FIG. 13 is a section view taken along line 13—13 of FIG. 9.

Referring now to FIG. 13, the steam-plug cover 330 includes a pair of pressure ports 350 that extend from the open interior 340 of the cover 330 to the exterior of the steam-plug cover 330. Each of the pressure ports 350 are formed in a top wall 352 of the steam-plug cover 330, as can also be seen in FIG. 8. The pressure relief ports 350 equalize the pressure within the open interior 340 and the area 354 contained above the steam-plug cover 330. In a prior art system not including the pressure ports 350, the pressure within the open interior 340 force the entire steam-plug cover 330 upward. Such pressure increases the difficulty of rotating the steam-plug cover 330 within the stationary diffuser tube 336. The pressure ports 350 provide pressure relief points for the cover to prevent internal steam pressure from creating a large force that would inhibit the free rotational movement of the steam-plug cover 330 within the unit. The pressure ports 350 pass through the upper plug wall 352 and allow steam pressure to release from within the open interior 340.

As mentioned previously, the Mach diffuser of the present invention is described as being particularly useful with a slurry of material, such as paper fiber. In some contemplated uses of the Mach diffuser of the present invention, the slurry includes abrasive particles, such as sand or other solid, particulate matter. In such a use, the sand particles entrained within the slurry create a great deal of wear with any components that are in contact with the moving slurry. As can be understood in FIG. 10, the deflector 349, the outer surface of the diffuser tube 336 and the inner wall 356 of the heater body 312 are in direct contact with the slurry being heated. In accordance with the present invention, each of these three components includes a wear coating to provide additional durability such that the heater of the present invention can be used in a slurry including entrained particulate matter.

Referring first to FIG. 11, the deflector 349 includes a main body 358 formed from a metallic material. The main body 358 includes a wear coating 360 applied over its entire surface area. In the preferred embodiment of the invention, the wear coating 360 is an arc welded overlay consisting of two applied layers of material that result in a thickness of approximately ¼ inch. In the preferred embodiment of the invention, the wear coating 360 is a tungsten carbide material in a nickel silicon boron matrix. Preferably, the wear coating 360 is applied to the metallic body 358 by GMAW welding process. Alternatively, the wear coating 360 could be a 65% tungsten carbide weld overlay applied via plasma transfer arc welding to the same ¼ inch thickness. The tungsten carbide wear coating 360 provides for increased durability of the deflector 340, which is placed directly in the flow of slurry as described.

Referring now to FIG. 7, the deflector 349 is mountable within the inlet 362 to the heater body 312 by a pair of connectors 364. The mounting of the deflector 349 by using removable and replaceable connectors 364 allows the deflector 349 to be easily replaced upon excessive wear. Referring now to FIG. 13, the deflector 349 is shown mounted in the inlet 362 by the pair of connectors 364.

Referring now to FIG. 11, the diffuser tube 336 also includes a wear coating 366, since the diffuser tube 336 also contacts the slurry, which may include abrasive entrained particulate matter. In the embodiment of the invention illustrated, the wear coating 366 extends around the entire outer circumference of the diffuser tube 336, including the emitter sections 337 area including the plurality of diffuser openings 338. The diffuser openings 338 extend through the wear coating 366 such that steam can escape the open interior 340 through the plurality of diffuser openings 338.

In the embodiment of the invention illustrated, the wear coating 366 applied to the diffuser is a high velocity oxy-fuel (HVOF) coating consisting of 88% tungsten carbide and 12% cobalt to a finished thickness of approximately 0.60 to 0.100 inches. The high velocity oxy-fuel coating allows the wear material to be applied to the outer surface of the diffuser tube 336 while allowing the diffuser openings 338 to remain open. In an alternate embodiment of the invention, the wear coating 366 could be 65% tungsten carbide weld applied via plasma transfer arc welding to the same thickness of 0.60 to 0.100 inches. In either case, the diffuser openings 338 remain unblocked to allow steam to escape from the open interior 340.

Figure 10:
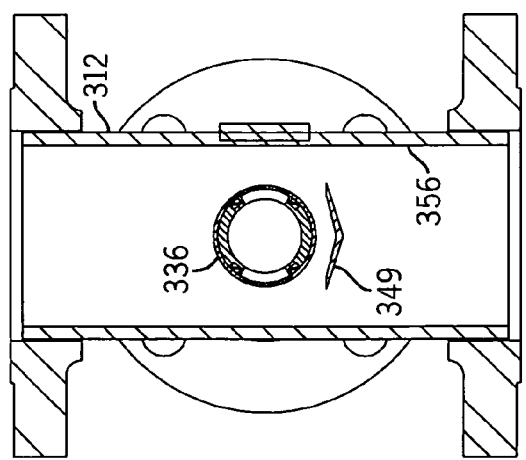
FIG. 10 is a section view taken along line 10—10 of FIG. 9.

Although not specifically shown in FIG. 10, the inner wall of the heater body 312 also includes a wear coating that is arc welded over the metal body using two equal passes to obtain a total thickness of approximately ¼ inch. In the preferred embodiment of the invention, the wear coating is a tungsten carbide material in a nickel silicon boron matrix. Preferably, the weld is applied in a GMAW process. In an alternative embodiment of the invention, the wear coating could be a 65% tungsten carbide weld overlay applied via plasma transfer arc welding to the same ¼ inch thickness.

Various alternatives and embodiments are contemplated as being within the scope of the following claims particularly pointing out and distinctly claiming the subject matter regarded as the invention.

What is claimed is:

1. A direct contact steam injection heater comprising:
    a heater body having a steam inlet, a flowing stock inlet and a heated stock discharge outlet, the flowing stock inlet and the heated stock discharge outlet being aligned such that the flowing stock flows through the heater body generally in an axial direction;
    a diffuser tube mounted transverse to the axial direction of stock flow through the heater body, the diffuser tube having a cylindrical outer wall having a first emitter section and a second emitter section, each emitter section having a plurality of steam diffusion holes, the diffuser tube being arranged to receive the flow of steam and discharge the steam through the diffusion holes into the flowing stock;
    an adjustably positionable steam-plug cover positioned within the diffuser tube, the steam-plug cover having a cylindrical outer wall defining an open interior that receives a flow of steam, the outer wall having a first open slot and a second open slot that enables steam to flow out of the open interior; and
    a first resilient seal member surrounding the first open slot formed in the steam-plug cover and a second resilient seal member surrounding the second open slot, wherein the first and second seal members contact an inner wall of the diffuser tube to provide a seal between the inner wall of the diffuser tube and the steam-plug cover surrounding the open slot,
    wherein the steam plug cover is adjustably positionable between a fully open position where a maximum number of steam diffusion holes are aligned with the open slots and a fully closed position in which no steam diffuser holes are aligned with the open slots,
    wherein the entire first emitter section is positioned between the first seal member and the second seal member and the entire second emitter section is positioned between the first seal member and the second seal member when the steam plug cover is in the fully closed position.

2. The direct contact steam injection heater of claim 1 wherein the seal member is a resilient O-ring.

3. The direct contact steam injection heater of claim 2 wherein each O-ring is received in a recessed slot formed in the steam-plug cover surrounding the open slot.

4. The direct contact steam injection heater of claim 1 wherein each of the open slots formed in the steam-plug cover occupies less than one quarter of the circumference of the steam-plug cover.

5. The direct contact steam injection heater of claim 1 further comprising a deflector placed upstream of the diffuser tube to redirect the flow of stock through the heater body toward the steam diffusion holes.

6. The direct contact steam injection heater of claim 5 wherein the deflector is removably mounted to opposing inside surfaces of the heater body.

7. The direct contact steam injection heater of claim 6 wherein the deflector includes a wear coating applied to an outer surface of the deflector.

8. The direct contact steam injection heater of claim 7 wherein the wear coating is formed from tungsten carbide.

9. A direct contact steam injection heater comprising:
a heater body having a steam inlet, a flowing stock inlet and a heated stock discharge outlet, the flowing stock inlet and the heated stock discharge outlet being aligned such that the flowing stock flows through the heater body generally in an axial direction;
a diffuser tube mounted transverse to the axial direction of stock flow through the heater body, the diffuser tube having a cylindrical outer wall having a plurality of steam diffusion holes, the diffuser tube being arranged to receive the flow of steam and discharge the steam through the diffusion holes into the flowing stock;
an adjustably positionable steam-plug cover positioned within the diffuser tube, the steam-plug cover having a cylindrical outer wall defining an open interior that receives a flow of steam, the outer wall having at least one open slot that enables steam to flow out of the open interior, the steam-plug cover including at least one pressure port extending through the outer wall and in communication with a driving assembly to equalize the pressure within the open interior of the steam-plug cover and the driving assembly;
a resilient seal member surrounding the open slot formed in the steam-plug cover, wherein the seal member contacts an inner wall of the diffuser tube to provide a seal between the inner wall of the diffuser tube and the steam-plug cover surrounding the open slot.

10. The direct contact steam injection heater of claim 9 wherein the diffuser tube includes a wear coating applied to an outer surface of the cylindrical outer wall.

11. The direct contact steam injection heater of claim 10 wherein the wear coating is formed from tungsten carbide.

12. A direct contact steam injection heater comprising:
a heater body having a steam inlet, a flowing stock inlet and a heated stock discharge outlet, the flowing stock inlet and the heated stock discharge outlet being aligned so that the flowing stock flows through the heater body generally in an axial direction;
a diffuser tube mounted transverse to the axial direction the stock flows through the heater body, the diffuser tube including a cylindrical outer wall having a plurality of steam diffusion holes, the diffuser tube being arranged to receive a flow of steam and discharge the steam through the diffusion holes into the stock, the diffuser tube including a wear coating formed on an outer surface of the cylindrical outer wall;
an adjustably positionable steam-plug cover positioned within the diffuser tube, the steam-plug cover having a cylindrical outer wall defining an open interior that receives a flow of steam, the outer wall having at least one open slot that enables steam to flow out of the open interior, the steam-plug cover including at least one pressure port extending through the outer wall and in communication with a driving assembly to equalize the pressure within the open interior of the steam-plug cover and the driving assembly; and
a deflector plate positioned upstream of the diffuser tube to redirect the flow of stock through the heater body toward the steam diffuser holes, the deflector including a wear coating formed along an outer surface.

13. The direct contact steam injection heater of claim 12 wherein the wear coating formed on the diffuser tube and the deflector plate is formed from tungsten carbide.

14. The direct contact steam injection heater of claim 12 further comprising a resilient seal member surrounding the open slot formed in the steam-plug cover, wherein the seal member contacts an inner wall of the diffuser tube to provide a seal around the open slot.

15. The direct contact steam injection heater of claim 14 wherein the steam-plug cover includes a pair of open slots, each open slot being surrounded by a seal member.

16. The direct contact steam injection heater of claim 15 wherein each of the open slots formed in the steam-plug cover occupies less than one quarter of the circumference of the steam-plug cover.

17. The direct contact steam injection heater of claim 16 wherein the steam-plug cover is adjustably positionable between a fully closed position in which no steam diffuser holes are aligned with the open slots to a fully open position where a maximum number of steam diffusion holes are aligned with the open slots.

18. The direct contact steam injection heater of claim 17 wherein the steam diffuser holes are positioned between the pair of seal members when the steam-plug cover is in the fully closed position.

* * * * *